(12) United States Patent
Carlblom et al.

(10) Patent No.: US 7,923,474 B2
(45) Date of Patent: Apr. 12, 2011

(54) AMINE DISPERSANTS, ORGANIC DISPERSIONS AND RELATED COATING COMPOSITIONS

(75) Inventors: Leland H. Carlblom, Gibsonia, PA (US); Terri L. Ziegler, Cranberry Township, PA (US); Stephen G. McQuown, Cheswick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 648 days.

(21) Appl. No.: 11/679,355

(22) Filed: Feb. 27, 2007

(65) Prior Publication Data

US 2008/0202382 A1    Aug. 28, 2008

(51) Int. Cl.
C09K 3/00    (2006.01)

(52) U.S. Cl. .......... 516/69; 523/205; 523/206; 427/221; 528/75; 528/76; 516/20

(58) Field of Classification Search ................. 523/205, 523/206; 427/221, 407, 555, 556; 524/107, 524/186; 528/75, 76; 516/20, 69
See application file for complete search history.

(56) References Cited

U.S. PATENT DOCUMENTS

| | | | |
|---|---|---|---|
| 4,224,212 A | 9/1980 | Topham | 260/33.6 |
| 4,373,930 A | 2/1983 | Rothwell | 8/527 |
| 4,645,611 A | 2/1987 | Campbell et al. | 252/62.51 |
| 4,861,380 A | 8/1989 | Campbell et al. | 106/504 |
| 5,700,395 A | 12/1997 | Thetford et al. | 252/309 |
| 5,734,002 A * | 3/1998 | Reich et al. | 528/53 |
| 6,136,943 A | 10/2000 | Kawashima et al. | |
| 6,194,539 B1 | 2/2001 | Matsui | 528/354 |
| 6,395,805 B1* | 5/2002 | Takao | 523/205 |
| 6,583,213 B1 | 6/2003 | Fawkes et al. | 524/539 |
| 6,787,600 B1 | 9/2004 | Thetford et al. | 524/599 |
| 6,884,286 B2 | 4/2005 | Thetford | 106/31.58 |
| 7,008,988 B2 | 3/2006 | Thetford et al. | 524/322 |
| 2003/0027873 A1 | 2/2003 | Thetford | 516/113 |
| 2003/0181544 A1* | 9/2003 | Thetford et al. | 523/160 |
| 2004/0115416 A1* | 6/2004 | Nonninger et al. | 428/304.4 |
| 2008/0103234 A1* | 5/2008 | Thetford | 524/107 |

FOREIGN PATENT DOCUMENTS

| | | | | |
|---|---|---|---|---|
| JP | 2002-293917 A | 10/2002 | | 65/329 |
| JP | 2002-294134 A | 10/2002 | | |
| JP | 2002-302474 A | 10/2002 | | 229/12 |
| WO | WO 2006/071460 | 7/2006 | | |

* cited by examiner

Primary Examiner — Gregory Listvoyb

(74) Attorney, Agent, or Firm — Donald R. Palladino

(57) ABSTRACT

Amine dispersants are disclosed. Also disclosed are organic dispersions that comprise ultrafine particles and an amine dispersant. The amine dispersant is the Michael addition product of reactants that include (a) a polyether (meth)acrylate and (b) a polyamine. Also disclosed are coating compositions that comprise such dispersions and substrates at least partially coated with such coating compositions.

16 Claims, No Drawings

AMINE DISPERSANTS, ORGANIC DISPERSIONS AND RELATED COATING COMPOSITIONS

FIELD OF THE INVENTION

The present invention relates to amine dispersants, organic dispersions containing amine dispersants, coating compositions that include such dispersions and substrates at least partially coated with a coating deposited from such compositions.

BACKGROUND INFORMATION

Coating compositions often include solid colorant and/or filler particles dispersed in a resinous binder system to impart color and/or performance properties in the resulting coating. Such particles tend to have a strong affinity for each other and, unless separated by, for example, some other material, tend to clump together to form agglomerates. Therefore, dispersants are often used in coating compositions. A dispersant is a substance that provides repulsion forces to counteract particle-particle attraction. Dispersants are often polymers that contain segments that adsorb to a particle surface and other segments that build loops or tails that provide steric stabilization.

Pigments and fillers used in coating compositions often consist of solid particles having a primary particle size of about 0.02 to 2 microns (i.e., 20 to 2000 nanometers). "Nanoparticulate" pigments and filler materials usually have an average primary particle size of 300 nanometers or less, sometimes 100 nanometers or less. Agglomeration is a serious problem for nanoparticulate pigments and filler materials because they have a relatively large surface area. Thus, acceptable dispersion of such nanoparticulates can often require an inordinate amount of conventional dispersant to effect de-agglomeration and to prevent subsequent re-agglomeration.

The presence of such high levels of dispersant, however, in the final coating composition can be detrimental to the resultant coating. For example, high levels of dispersants have been known to contribute to water sensitivity of a coating and to negatively impact the durability, hardness, and/or scratch resistance of such coatings.

As a result, it would be desirable to provide dispersions of nanoparticles wherein the dispersant can be used at reduced levels as compared to prior art dispersants. Such dispersions can, in at least some cases, allow for particle incorporation into coatings as desired, without negatively impacting film properties.

SUMMARY OF THE INVENTION

In certain respects, the present invention is directed to organic dispersions comprising: (a) a continuous phase comprising an organic medium; and (b) a dispersed phase comprising: (i) ultrafine particles; and (ii) an amine dispersant comprising the Michael addition product of reactants comprising or, in some cases, consisting essentially of: (A) a polyether (meth)acrylate and (B) a polyamine having a molecular weight of at least 300. In these embodiments of the present invention, the dispersant comprises at least 15 percent polyamine.

In other respects, the present invention is directed to amine dispersants comprising the Michael addition product of reactants comprising or, in some cases, consisting essentially of: (A) a polyether (meth)acrylate and (B) a polyamine having a molecular weight of 300 to 1,500. In these embodiments of the present invention, the dispersant comprises at least 15 percent polyamine.

In still other respects, the present invention is directed to organic dispersions comprising: (a) a continuous phase comprising an organic medium; and (b) a dispersed phase comprising: (i) ultrafine particles; and (ii) an amine dispersant of the general formula $Z-CH_2-CHR^1-COO(R^2-O)_nR^3$, wherein Z represents a moiety comprising a plurality of amino groups; $R^1$ represents hydrogen or a methyl group; each $R^2$, which may be the same or different, represents an alkyl group comprising from 1 to 5 carbon atoms; $R^3$ is either hydrogen or a saturated or unsaturated alkyl, alkylphenyl or alkylether group; and n is an integer having a value of 2 to 20.

The present invention is also directed to related coating compositions and substrates at least partially coated with a coating deposited from such coating compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to organic dispersions. As used herein, the term "organic dispersion" refers to a two-phase system in which a dispersed phase comprises solids particles that are distributed throughout a continuous phase that comprises an organic medium.

As indicated, in the organic dispersions of the present invention, the continuous phase comprises an organic medium. Suitable organic mediums include polar organic mediums and substantially non-polar aromatic hydrocarbons or halogenated hydrocarbons. As used herein, the term "polar", when used in relation to the organic medium, refers to an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the above-mentioned article.

Examples of suitable polar organic liquids are ethers, such as lower alkyl ethers, esters, ketones, glycols, alcohols and amides. Numerous specific examples of such moderately and strongly hydrogen bonding liquids are given in the book entitled "Compatibility and Solubility" by Ibert Mellan (published in 1968 by Noyes Development Corporation) in Table 2.14 on pages 39 and 40 and these liquids all fall within the scope of the term polar organic liquid as used herein.

Non-limiting specific examples of suitable polar organic liquids are dialkyl ketones, alkyl esters of alkane carboxylic acids and alkanols, such liquids containing up to, and including, a total of 6 carbon atoms, for example, dialkyl and cycloalkyl ketones, such as acetone, methyl-ethyl-ketone, diethylketone, di-iso-propylketone, methyliso-butyl-ketone, di-iso-butylketone, methyl-iso-amyl-ketone, methyl-n-amyl-ketone and cyclohexanone; alkyl esters, such as methyl acetate, ethyl acetate, isopropyl acetate, butyl acetate, ethyl formate, methyl propionate and ethyl butyrate, glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate, alkanols such as methanol, ethanol, n-propanol, isopropanol, n-butanol and isobutanol and dialkyl and cyclic ethers such as diethylether and tetrahydrofuran. Mixtures of two or more of the foregoing polar organic liquids may be used.

Non-limiting specific examples of suitable substantially non-polar, organic liquids which may be used, either alone or in admixture with the aforementioned polar solvents, are aromatic hydrocarbons, such as toluene and xylene, and halogenated aliphatic and aromatic hydrocarbons, such as trichloroethylene, perchloroethylene and chlorobenzene.

As previously indicated, the dispersed phase of the dispersions of the present invention comprises ultrafine particles. As used herein, the term "ultrafine particles" refers to particles that have a B.E.T. specific surface area of at least 10 square meters per gram, such as 30 to 500 square meters per gram, or, in some cases, 80 to 250 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the previously described ultrafine particles have a calculated equivalent spherical diameter of no more than 200 nanometers, such as no more than 100 nanometers, or, in certain embodiments, 5 to 50 nanometers. As will be understood by those skilled in the art, a calculated equivalent spherical diameter can be determined from the B.E.T. specific surface area according to the following equation:

$$\text{Diameter (nanometers)} = 6000 / [BET(m^2 g) * \rho(\text{grams/cm}^3)]$$

In certain embodiments, the ultrafine particles present in the dispersed phase of the dispersions of the present invention have an average primary particle size of no more than 300 nanometers, such as no more than 200 nanometers, or, in some cases, no more than 100 nanometers, or, in yet other cases, no more than 50 nanometers, or, in certain embodiments, no more than 20 nanometers, as determined by visually examining a micrograph of a transmission electron microscopy ("TEM") image, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle as opposed to an agglomeration of two or more individual particles.

The shape (or morphology) of the particles can vary. For example, generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), Handbook of Fillers and Plastics (1987) at pages 9-10.

Depending on the desired properties and characteristics of the resultant dispersion and/or coating compositions of the present invention (e.g., coating hardness, scratch resistance, stability, or color), mixtures of one or more particles having different average particle sizes can be employed.

The ultrafine particles present in the dispersions of the present invention can be formed from polymeric and/or non-polymeric inorganic materials, polymeric and/or non-polymeric organic materials, as well as mixtures of any of the foregoing. As used herein, "formed from" denotes open, e.g., "comprising," claim language. As such, it is intended that a composition or substance "formed from" a list of recited components be a composition comprising at least these recited components, and can further comprise other, non-recited components, during the composition's formation. Additionally, as used herein, the term "polymer" is meant to encompass oligomers, and includes without limitation both homopolymers and copolymers.

As used herein, the term "polymeric inorganic material" means a polymeric material having a backbone repeat unit based on an element or elements other than carbon. Moreover, as used herein, the term "polymeric organic materials" means synthetic polymeric materials, semi-synthetic polymeric materials and natural polymeric materials, all of which have a backbone repeat unit based on carbon.

The term "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate.

As used herein, the term "inorganic material" means any material that is not an organic material.

In certain embodiments of the present invention, the ultrafine particles comprise an inorganic material. Suitable ultrafine particles can be formed from ceramic materials, metallic materials, and mixtures of any of the foregoing. Non-limiting examples of such ceramic materials are metal oxides, mixed metal oxides, metal nitrides, metal carbides, metal sulfides, metal silicates, metal borides, metal carbonates, and mixtures of any of the foregoing. A specific, non-limiting example of a metal nitride is boron nitride; a specific, non-limiting example of a metal oxide is zinc oxide; non-limiting examples of suitable mixed metal oxides are aluminosilicates and stannosilicates; non-limiting examples of suitable metal sulfides are molybdenum disulfide, tantalum disulfide, tungsten disulfide, and zinc sulfide; non-limiting examples of metal silicates are aluminum silicates and magnesium silicates, such as vermiculite.

In certain embodiments of the present invention, the ultrafine particles comprise inorganic materials selected from aluminum, barium, bismuth, boron, cadmium, calcium, cerium, cobalt, copper, iron, lanthanum, magnesium, manganese, molybdenum, nitrogen, oxygen, phosphorus, selenium, silicon, silver, sulfur, tin, titanium, tungsten, vanadium, yttrium, zinc, and zirconium, including oxides thereof, nitrides thereof, phosphides thereof, phosphates thereof, selenides thereof, sulfides thereof, sulfates thereof, and mixtures thereof. Suitable non-limiting examples of the foregoing inorganic ultrafine particles include alumina, silica, titania, ceria, zirconia, bismuth oxide, magnesium oxide, iron oxide, aluminum silicate, boron carbide, nitrogen doped titania, and cadmium selenide.

The ultrafine particles can comprise, in certain embodiments, a core of essentially a single inorganic oxide, such as silica in fumed or amorphous form, alumina, titanium dioxide, iron oxide, cesium oxide, yttrium oxide, zirconia, and mixtures of any of the foregoing; or an inorganic oxide of one type upon which is deposited an organic oxide of another type.

Non-polymeric, inorganic materials useful in forming the ultrafine particles used in the present invention can comprise inorganic materials selected from graphite, metals, oxides, carbides, nitrides, borides, sulfides, silicates, carbonates, sulfates, and hydroxides. A non-limiting example of a useful inorganic oxide is zinc oxide. Non-limiting examples of suitable inorganic sulfides include molybdenum disulfide, tantalum disulfide, tungsten disulfide, and zinc sulfide. Non-limiting examples of useful inorganic silicates include aluminum silicates and magnesium silicates, such as vermiculite. Non-limiting examples of suitable metals include molybdenum, platinum, palladium, nickel, aluminum, copper, gold, iron, silver, alloys, and mixtures of any of the foregoing.

In certain embodiments, the ultrafine particles are selected from fumed silica, amorphous silica, alumina, titanium dioxide, iron oxide, cesium oxide, yttrium oxide, zirconia, and mixtures of any of the foregoing.

In certain embodiments, and without limiting the present invention, an inorganic ultrafine particle formed from an inorganic material, such as silicon carbide or aluminum nitride, can be provided with a silica, carbonate or nanoclay coating to form a useful composite particle.

In certain embodiments, the ultrafine particles used in the present invention have a lamellar structure. Particles having a lamellar structure are composed of sheets or plates of atoms in hexagonal array, with strong bonding within the sheet and weak van der Waals bonding between sheets, providing low shear strength between sheets. A non-limiting example of a lamellar structure is a hexagonal crystal structure. Inorganic solid ultrafine particles having a lamellar fullerene (i.e., buckyball) structure are also useful in the present invention.

Non-limiting examples of suitable materials having a lamellar structure include boron nitride, graphite, metal dichalcogenides, mica, talc, gypsum, kaolinite, calcite, cadmium iodide, silver sulfide and mixtures thereof. Suitable metal dichalcogenides include molybdenum disulfide, molybdenum diselenide, tantalum disulfide, tantalum diselenide, tungsten disulfide, tungsten diselenide and mixtures thereof.

The ultrafine particles can be formed from non-polymeric, organic materials, such as, for examples, stearates (such as zinc stearate and aluminum stearate), diamond, carbon black and stearamide.

The ultrafine particles used in the present invention can be formed from inorganic polymeric materials, such as, for example, polyphosphazenes, polysilanes, polysiloxanes, polygermanes, polymeric sulfur, polymeric selenium, silicones and mixtures of any of the foregoing.

In certain embodiments, the ultrafine particles used in the present invention comprise an organic pigment, for example, azo compounds (monoazo, di-azo, β-Naphthol, Naphthol AS salt type azo pigment lakes, benzimidazolone, di-azo condensation, isoindolinone, isoindoline), and polycyclic (phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures of any of the foregoing. In certain embodiments, the organic material is selected from perylenes, quinacridones, phthalocyanines, isoindolines, dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, as well as substituted derivatives thereof, and mixtures thereof.

Mixtures of any of the previously described inorganic ultrafine particles and/or organic ultrafine particles can also be used.

In certain embodiments, the ultrafine particles used in the dispersions of the present invention comprise color-imparting particles. By the term "color-imparting particles" is meant a particle that significantly absorbs some wavelengths of visible light, that is, wavelengths ranging from 400 to 700 nm, more than it absorbs other wavelengths in the visible region.

In addition to the ultrafine particles, the dispersed phase of the organic dispersions of the present invention also comprises an amine dispersant. As used herein, the term "amine dispersant" refers to a compound that includes an amine group in its molecular structure and which acts to counteract particle-particle attraction when incorporated into an organic dispersion. In certain embodiments, the amine dispersant of the present invention comprises the Michael addition product of reactants comprising, or, in some cases, consisting essentially of: (a) a polyether (meth)acrylate and (b) a polyamine. As used herein, the phrase "consisting essentially of", when used with reference to the reactants that form the Michael addition reaction product, means that no other reactants participate in the reaction to an extent sufficient to materially impact upon the properties of the resulting amine dispersant.

As will be appreciated by those skilled in the art, the reaction of an amine group with an ethylenically unsaturated group is often referred to as a Michael addition reaction. As a result, as used herein, the term "Michael addition product" is meant to refer to the product of such a reaction.

As previously indicated, one of the reactants that forms the Michael addition product in certain embodiments of the present invention is a polyether (meth)acrylate. As used herein, the term "polyether (meth)acrylate" refers to a compound that includes more than one ether group per molecule and at least one (meth)acrylate group per molecule, such as compounds represented by the general structure

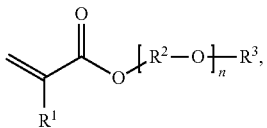

wherein $R^1$ is hydrogen or a methyl group; each $R^2$, which can be the same or different, is a branched or linear alkyl group comprising 1 to 5 carbon atoms; $R^3$ is hydrogen or a saturated or unsaturated alkyl, alkylphenyl, or alkylether group; and n is an integer having a value of 2 to 20, such as 3 to 12. As used herein, the term (meth)acrylate refers to methacrylates, acrylates and mixtures of methacrylates and acrylates.

Specific examples of polyether (meth)acrylates, which are suitable for use in the present invention, include, but are not limited to, monoacrylates having alkoxylated chains, e.g. ethoxy or polyethylene oxide structure, e.g., polyethylene glycol mono(meth)acrylates, such as methoxy polyethyleneglycol (meth)acrylate, polypropylene glycol mono(meth)acrylates (e.g. Photomer 8061, Photomer 4960, and Bisomer PPA6 from Cognis Corp.; Miramer M1602 from Miwon Commercial Co., Ltd.; and SR604, CD513 and CD611 from Sartomer Co.), poly(tetrahydrofuran)(meth)acrylates; ethoxy ethoxyethyl acrylate (EOEOEA), ethyltriethylene glycol methacrylate, ethoxylated phenoxy ethyl acrylate, monomethoxy neopentyl glycol propoxylate monoacrylate (Photomer 8127 from Henkel); and mono or multi acrylates having alkoxylated chains e.g. ethoxy or poly ethylene oxide structure, as well as mixtures thereof.

As indicated, in the amine dispersants described herein the polyether(meth)acrylate is reacted with a polyamine. As used herein, the term "polyamine" refers to a compound comprising two or more amines per molecule, wherein "amine" refers to $R_{3-x}NH_x$ where each R, which may the same or different, is a hydrocarbon group and $0 \leq x \leq 3$. Moreover, in the amine dispersants utilized in the present invention the polyamine has a molecular weight of at least 300. In certain embodiments, the polyamine is a polymeric material having a weight average molecular weight of at least 300, such as 300 to 1,500, or, in some cases, 300 to 1,000, as determined from gel permeation chromatography (GPC) using polystyrene standards.

Suitable polyamines include, for example, polyallylamine, polyvinylamine, polyoxypropylenediamine, polyoxyethylenediamine, poly($C_{2-4}$)-alkyleneimines, which can be linear or branched, such as polyethyleneimine (PEI), as well as mixtures of any of the foregoing. As used herein, the term "poly($C_{2-4}$)-alkyleneimine" refers to compounds having the structure:

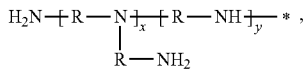

wherein each R, which may be the same or different, is an alkyl group comprising 2 to 4 carbon atoms, and the ratio of x:y is 1:2.

As a result, certain embodiments of the present invention are directed to amine dispersants comprising the Michael addition product of reactants comprising or, in some cases, consisting essentially of: (A) a polyether(meth)acrylate and (B) a polyamine having a weight average molecular weight of 300 to 1,500, wherein, as described below, the dispersant comprises at least 15 percent polyamine.

The Michael addition reaction between the polyether (meth)acrylate and the polyamine can be carried out under any suitable conditions that will be apparent to the skilled in the art, such as, for example, those demonstrated in the Examples herein. In certain embodiments, the reaction is carried out at a temperature of 20 to 80° C., such as 22 to 50° C. In certain embodiments, stoichiometrically equal amounts of the reactants are used, whereas, in other embodiments, an excess of amine groups is used, such that 20 to 35 percent, such as 25 to 35 percent, of the amine groups present are reacted with the polyether(meth)acrylate. Moreover, the Michael addition reaction may be carried out in the presence of a solvent that is inert to the reactants, such as, for example, aromatic and/or aliphatic solvents, including xylene, toluene and Solvesso, ketones, such as acetone, methylethylketone and methylisobutylketone, alkanols such as methanol, n-butanol and isopropanol, esters, such as ethyl acetate and butyl acetate, glycol esters and ethers, such as propylene glycol monomethyl ether, ethers, such as dimethyladipate, dimethylsuccinate and dimethylglutarate, as well as mixtures thereof.

As indicated previously, the amine dispersants utilized in the present invention comprise at least 15 percent polyamine, such as at least 20 percent polyamine, or, in some cases, at least 25 percent polyamine. As used herein, when it is stated that the amine dispersant comprises at least "x" percent polyamine, it means that the ratio of the weight of the polyamine to the weight of the Michael addition reaction product is at least x/100. The Examples herein are illustrative.

In certain embodiments, the Michael addition reaction product is substantially or, in some cases, completely free of polyester, such as polyoxyalkenylenecarbonyl (POAC) chains, which have been discovered to, in at least some cases, result in undesirable flocculation in the dispersions of the present invention. In certain embodiments, the Michael addition reaction product is substantially or, in some cases, completely free of any amide and/or salt linkages. In certain embodiments, the Michael addition reaction product is substantially or, in some cases, completely free of any residues of an epoxide/amine reaction. As used in this paragraph, the term "substantially free" means that the material being discussed is present in a composition, if at all, as an incidental impurity, and the term "completely free" means that the material being discussed is not present in a composition at all.

As will be appreciated from the foregoing description, in certain embodiments, the amine dispersant utilized in the dispersions of the present invention can be present by the general formula $Z—CH_2—CHR^1—COO(R^2—O)_nR^3$, wherein Z represents a moiety comprising a plurality of amino groups; $R^1$ represents hydrogen or a methyl group; each $R^2$, which may be the same or different, represents an alkyl group comprising from 1 to 5 carbon atoms; $R^3$ is either hydrogen or a saturated or unsaturated alkyl, alkylphenyl or alkylether group; and n is an integer having a value of 2 to 20, such as 3 to 12.

In certain embodiments of the dispersions of the present invention, the dispersant is present in an amount of no more than 50 percent, such as no more than 40 percent, or, in yet other cases, no more than 30 percent by weight, based on the total weight of the ultrafine particles present in the dispersion. Indeed, it was a surprising discovery of the present invention that the amine dispersants of the present invention can sufficiently disperse ultrafine particles, while being used at reduced levels as compared to prior art dispersants. Such dispersants can, in at least some cases, allow for particle incorporation into coatings as desired, without negatively impacting film properties.

In certain embodiments, the present invention is directed to a dispersion comprising the previously described components, wherein the dispersion comprises a film-forming resin and, as a result, the dispersion, in these embodiments, is a coating composition. As used herein, the term "film-forming resin" refers to resins that can form a self-supporting continuous film on at least a horizontal surface of a substrate upon removal of any diluents or carriers present in the composition or upon curing at ambient or elevated temperature.

The coating composition(s) can comprise any of a variety of thermoplastic and/or thermosetting compositions known in the art. The thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

In addition to or in lieu of the above-described crosslinking agents, the coating composition comprises at least one film-forming resin. Thermosetting or curable coating compositions typically comprise film forming polymers having functional groups that are reactive with the crosslinking agent. The film-forming resin in the first coating composition may be selected from any of a variety of polymers well-known in the art. The film-forming resin can be selected from, for example, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof.

Appropriate mixtures of film-forming resins may also be used in the preparation of the coating compositions.

In certain embodiments, the film-forming resin is present in the coating composition in an amount greater than 30 weight percent, such as greater than 40 weight percent and less than 90 weight percent, or, in some cases, greater than 50 weight percent and less than 90 weight percent, with weight percent being based on the total weight of the liquid coating composition. For example, the weight percent of resin can be between 30 and 90 weight percent. When at least one curing agent is used, it may, in certain embodiments, be present in an amount of up to 70 weight percent, such as between 10 and 70 weight percent; this weight percent is also based on the total weight of the coating composition.

If desired, the coating composition can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, catalysts and other customary auxiliaries.

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates also include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable substrates also include metallic substrates, such as, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Polymeric substrates are also suitable and include, for example, polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co) polymers of (meth) acrylic acid compounds or melamine/, dicyanodiamide/and/or urea/formaldehyde resins.

The coating compositions of the present invention are also suitable for application to compressible substrates, such as foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

After application of the coating compositions of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. The film is formed on the surface of the substrate by driving diluent, i.e., organic solvent and/or water, out of the film by heating or by an air drying period. In some cases, the heating will only be for a short period of time, sufficient to ensure that any subsequently applied coatings can be applied to the film without dissolving the composition. Suitable drying conditions will depend on the particular composition, but, in general, a drying time of from about 1 to 5 minutes at a temperature of about 68° F. to 250° F. (20° C. to 121° C.) will be adequate. More than one coat of the coating composition may be applied to develop the optimum appearance. Between coats, the previously applied coat may be flashed, that is, exposed to ambient conditions for about 1 to 20 minutes.

The coating compositions of the present invention may be used as a single coating, a clear top coating, a base coating in a two-layered system, or one or more layers of a multi-layered system including a clear top coating composition, colorant layer and base coating composition, or as a primer layer.

In certain embodiments, the coating compositions of the present invention may be used as part of a multi-layer composite coating, such as a "color-plus-clear" coating system, which includes at least one pigmented or colored base coat and at least one clear topcoat. As a result, the present invention is also directed to multi-layer composite coatings, wherein at least one coating layer is deposited from a composition comprising a coating composition of the present invention. In certain embodiments, all of the layers of such a multi-layer composite coating are deposited from a composition comprising a coating composition of the present invention.

Illustrating the invention are the following examples that are not to be considered as limiting the invention to their details. All parts and percentages in the examples, as well as throughout the specification, are by weight unless otherwise indicated.

EXAMPLE 1

To a mixture of 80.74 grams of an 800 weight average molecular weight PEI and 94.22 grams of DOW ANOL PM (a propylene glycol monomethyl ether commercially available from Dow Chemical Company) was added at room temperature over a 1 hour and 45 minute period, a mixture of 174.40 grams of Photomer 8127 and 191.35 grams of butyl acetate. Following the addition, the reaction mixture was warmed to 50° C. and held for 2 hours. This yielded a dispersant that was 31.6% PEI polyamine at 41.2% solids.

EXAMPLE 2

To a mixture of 45.48 grams of an 800 weight average molecular weight PEI and 94.41 grams of DOW ANOL PM was added at room temperature over a 1 hour and 15 minute period, a mixture of 211.16 grams of a 618 molecular weight poly(propylene oxide) monoacrylate and 192.51 grams of butyl acetate. Following the addition, the reaction mixture was warmed to 50° C. and held for 2 hours. This yielded a dispersant that was 17.7% PEI polyamine at 48.0% solids.

EXAMPLE 3

To a mixture of 42.55 grams of a 300 weight average molecular weight PEI and 38.72 grams of DOW ANOL PM was added at room temperature over a 1 hour period, a mixture of 110.65 grams of Photomer 8061 and 115.82 grams of butyl acetate. Following the addition, the reaction mixture was warmed to 50° C. and held for 2 hours. This yielded a dispersant that was 27.8% PEI polyamine at 46.9% solids.

EXAMPLE 4

To a mixture of 61.48 grams of an 800 weight average molecular weight PEI and 945.55 grams of DOW ANOL PM was added at room temperature over a 2 hour period, a mixture of 142.71 grams of a 618 molecular weight poly(propylene oxide) monoacrylate, 66.33 grams of Photomer 8127, and 175.56 grams of butyl acetate. Following the addition, the reaction mixture was warmed to 50° C. and held for 2 hr. This yielded a dispersant that was 22.7% PEI polyamine at 48.7% solids.

COMPARATIVE EXAMPLE 1

To a mixture of 35.50 grams diethylenetriamine (theoretical molecular weight of 103) and 33.69 grams of DOW ANOL PM was added at room temperature over a 1 hour and 45 minute period a mixture of 99.26 grams of Photomer 8127 and 101.07 grams of butyl acetate. Following the addition, the reaction mixture was warmed to 50° C. and held for 2 hours. This yielded a dispersant that was 26.3% PEI polyamine at 37.7% solids.

COMPARATIVE EXAMPLE 2

To a mixture of 44.30 grams of a 25,000 weight average molecular weight PEI and 47.8 grams of DOW ANOL PM was added at room temperature a mixture of 95.69 grams of Photomer 8127 and 104.99 grams of butyl acetate. When approximately 25% of the Photomer-butyl acetate mixture had been added, the PEI material began to separate out of solution and eventually became swelled with the solvent. Since this material exhibited poor solubility, it could not function as a dispersant.

DISPERSION EXAMPLES

Four dispersions (Dispersion Examples 1 to 4) were prepared according to the compositions described in Table 1. To a blend of DOW ANOL PM and Butyl Acetate at room temperature, the specified dispersant was added and stirred until homogenous. To this mixture was slowly added aluminosilicate nanoparticles. The dispersion pre-mix was then circulated batch-wise five times through a "Red Head" model L-2 top feed continuous mill available from CB Mills which was packed with 0.7-1.2 mm Zirconox® ceramic media available from Jyoti Ceramic Industries Pvt. Ltd. The final pre-dispersion sample was then recirculated for 90 minutes through a MegaVantis® V3 mill from Draiswerke, Inc. using 0.2 mm YTZ® ceramic media, available from the Tosah Corporation, which filled the grinding chamber at 75% by volume.

TABLE 1

|  | Dispersion Ex. 1 | | Dispersion Ex. 2 | | Dispersion Ex. 3 | | Dispersion Ex. 4 | |
| --- | --- | --- | --- | --- | --- | --- | --- | --- |
|  | Parts by solids | Charge (grams) | Parts by solids | Charge (grams) | Parts by solids | Charge (grams) | Parts by solids | Charge (grams) |
| Butyl Acetate | n/a | 340.6 | n/a | 184.0 | n/a | 326.8 | n/a | 331.6 |
| Dowanol PM | n/a | 183.4 | n/a | 176.0 | n/a | 198.2 | n/a | 188.8 |
| Example 1 Dispersant | 3.75 | 76.0 | — | — | — | — | — | — |
| Solsperse ® 32500[1] | — | — | 12.00 | 240.0 | 3.75 | 75.00 | — | — |
| Comparative Example 1 Dispersant | — | — | — | — | — | — | 3.75 | 79.6 |
| Aluminosilicate Nanoparticles[2] | 25.00 | 200.0 | 25.00 | 200.0 | 25.00 | 200.0 | 25.00 | 200.0 |

[1] A solution of 40% active polymeric dispersant (believed to contain about 10% PEI polyamine) in n-butyl acetate, commercially available from Noveon Performance Coatings.
[2] Aluminosilicate nanoparticles comprising approximately 70% by weight silica and 30% by weight alumina and commercially available from NanoProducts Corporation. The particles had a calculated density of 2.59 mg/l and were substantially spherical, colorless, and free of surface of hydroxyl groups and substantially free of surface treatment. The particles had a BET surface area of 85.2 $m^2$/g as measured on a Micromeritics Gemini Surface Area and Pore Size Analyzer, which results in a calculated equivalent spherical diameter for the primary particle size of 27.1 nanometers.

The resulting dispersions were collected and characterized. Results are set forth in Table 2.

TABLE 2

| Example | Number Average Particle Size[1] |
| --- | --- |
| Dispersion Example 1 | 32.8 nanometers |
| Dispersion Example 2 | 60.0 nanometers |
| Dispersion Example 3 | >1 micron particles present[2] |
| Dispersion Example 4 | Not processable[3] |

[1] Particle diameters were measured on a Malvern ZetaSizer 3000 HSa.
[2] Particle size indicates an unacceptable dispersion.
[3] This dispersion had a much greater initial viscosity than the other examples and could not be processed through the Red Head mill and, therefore, was aborted.

COATING COMPOSITION EXAMPLES

Three coating compositions (Coating Examples 1, 2 and 3) were prepared. Example 1 was a two component isocyanate type polyurethane clearcoat based on a hydroxyl-containing acrylic polymer reacted with a blend of polyisocyanates. Example 2 was similar to Example 1, but included 150% by solid binder weight aluminosilicate nanoparticles from Dispersion Example 1. Example 3 was similar to Example 2, but the composition contained 150% by solid binder weight aluminosilicate nanoparticles from Dispersion Example 2. In Coating Examples 2 and 3, the nanoparticles were suspended in that they did not agglomerate while the coating composition was being evaluated. The solvent system composition for the three examples was adjusted with Butyl Acetate and DOW ANOL PM to be equivalent. The formulations for Examples 1-3 are described in Table 3 below.

TABLE 3

| Ingredient | Coating Example 1 (grams) | Coating Example 2 (grams) | Coating Example 3 (grams) |
| --- | --- | --- | --- |
| Binder | | | |
| Acrylic Polyol[1] | 15.25 | 12.54 | 11.95 |
| Desmodur Z4470 SN[2] | 6.29 | 5.15 | 4.93 |
| Desmodur N3390 BA/SN[3] | 3.86 | 3.16 | 3.03 |
| Additives | | | |
| Chisorb 353[4] | 0.28 | 0.23 | 0.22 |
| Eversorb 76[5] | 0.18 | 0.15 | 0.14 |
| Tin 328[6] | 0.37 | 0.31 | 0.29 |
| Byk-410[7] | 0.12 | 0.09 | 0.09 |
| Multiflow[8] | 0.07 | 0.06 | 0.06 |
| Zoldine MS-Plus[9] | 0.27 | 0.22 | 0.21 |
| Acrylic Flow Additive[10] | 0.15 | 0.13 | 0.12 |
| Dispersion Example 1 | — | 121.40 | — |
| Dispersion Example 2 | — | — | 114.7 |
| Solvents | | | |
| Eastman EEP | 5.82 | 4.78 | 4.56 |
| PM Acetate | 2.04 | 1.68 | 1.60 |
| n-Butyl Acetate | 75.00 | — | 5.30 |
| Dowanol PM | 40.40 | — | 2.90 |

[1] The acrylic polymer was prepared with N-Butyl Methacrylate, Hydroxypropyl Acrylate, Methyl Methacrylate, Styrene, N-Butyl Acrylate, Glacial Acrylic Acid, and Tertiary Dodecane Thiol at 70% solids in a solvent system of Xylene and Aromatic 100.
[2] Aliphatic polyisocyanate resin solution based on isophorone diisocyanate available commercially from Bayer Material Science.
[3] Aliphatic polyisocyanate resin solution based on hexamethylene diisocyanate available commercially from Bayer Material Science.
[4] Hindered amine light stabilizer available commercially from Chitec Chemical Co.
[5] UV absorber available commercially from Everlight Chemical Taiwan.
[6] UV absorber available commercially from Ciba Additives.
[7] Urea/urethane solution available commercially from Byk Chemie.
[8] Flow modifier available commercially from Cytec Surface Specialties.
[9] Oxazolidine moisture scavenger available commercially from Angus Chemical Co.
[10] The acrylic flow additive is available from DuPont Canada as RK-5345.

For Coating Example 1, the polyol resin was stirred together in a vessel with the additives, a portion of the Eastman EEP, the PM Acetate, Butyl Acetate and Dowanol PM. The aliphatic isocyanates and the remaining Eastman EEP were stirred together in a second vessel. The two components were then mixed immediately before application.

For Coating Example 2, the polyol resin was stirred together in a vessel with the additives, Dispersion Example 1, a portion of the Eastman EEP and the PM Acetate. The aliphatic isocyanates and the remaining Eastman EEP were stirred together in a second vessel. The two components were then mixed immediately before application.

For Coating Example 3, the polyol resin was stirred together in a vessel with the additives, Dispersion Example 2, a portion of the Eastman EEP, the PM Acetate, Butyl Acetate and Dowanol PM. The aliphatic isocyanates and the remaining Eastman EEP were stirred together in a second vessel. The two components were then mixed immediately before application.

APPLICATION AND TESTING

The coatings of Coating Examples 1, 2, and 3 were applied to ED6061 black electrocoated steel panels, available from ACT Laboratories, with a #78 wet film applicator rod, available from Paul N. Gardner Company, Inc. The coated panels were flashed at room temperature for 10 minutes and then baked horizontally for 30 minutes at 285° F. The cured coatings were evaluated for hardness and mar resistance properties. Hardness was measured using a Fischerscope H100 microhardness apparatus with a MK222 Vickers type indentor available from Fischer Technology, Inc. U.S.A. The average of two measurements is reported in the table below. Mar resistance was measured by taking an initial 20° gloss reading with a Novogloss glossmeter available from Paul N. Gardner Company, Inc. The coated substrate was then subjected to linear scratching with a weighted abrasive paper for ten double rubs using an AATCC Scratch Tester, Model CM-5, also known as a "Crockmeter", available from the Atlas Electrical Devices Company. The abrasive paper was 3M 281Q WETORDRY™ PRODUCTION™ 9 micron polishing paper available from the 3M™ Company. Two abrasion stripes were made for each of the two polishing papers. The panels were then rinsed with cold tap water and carefully blotted dry. The 20° gloss was then measured in each scratched stripe and the average determined. The reported values are the percent of the initial gloss retained after scratching, i.e. 100×(average of scratched gloss)/(initial gloss). Results are set forth in Table 4.

TABLE 4

|  | Coating Example 1 | Coating Example 2 | Coating Example 3 |
|---|---|---|---|
| Fischer Microhardness (N/mm2) | 170.0 | 278.3 | 89.8 |
| Mar Resistance (% 20° gloss retention) | 14.3 | 54.7 | 4.2 |

The addition of the nanoparticle dispersion in Coating Example 2 increased the hardness of the cured film and improved the mar resistance over Coating Example 1 which did not contain any nanoparticles. In Coating Example 3 however, the addition of the nanoparticle dispersion actually decreased the hardness of the cured film and weakened the mar resistance because of the high level of the commercial dispersant in the nanoparticle dispersion.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:
1. An organic dispersion comprising:
 (a) a continuous phase comprising an organic medium; and
 (b) a dispersed phase comprising:
  (i) ultrafine particles; and
  (ii) an amine dispersant comprising the Michael addition product of reactants comprising:
   (A) a polyether (meth)acrylate and
   (B) a polyamine having a molecular weight of at least 300,
  wherein the dispersant comprises at least 15 percent polyamine.
2. The organic dispersion of claim 1, wherein the polyether (meth)acrylate comprises a polypropylene glycol monoacrylate.
3. The organic dispersion of claim 1, wherein the polyamine comprises a poly($C_{2-4}$)-alkyleneimine.
4. The organic dispersion of claim 3, wherein the poly($C_{2-4}$)-alkyleneimine comprises polyethyleneimine.
5. The organic dispersion of claim 1, wherein the polyamine has a weight average molecular weight of 300 to 1,500.
6. The organic dispersion of claim 1, wherein the Michael addition reaction product is substantially free of polyester.
7. The organic dispersion of claim 1, wherein the ultrafine particles have an average primary particle size of 300 nanometers or less.
8. The organic dispersion of claim 1, wherein the ultrafine particles comprise a mixed metal oxide.
9. The organic dispersion of claim 1, wherein the ultrafine particles comprise silica.
10. A coating composition comprising:
 (a) the dispersion of claim 1, and
 (b) a film-forming resin.
11. A substrate at least partially coated with a coating deposited from the coating composition of claim 10.
12. An organic dispersion comprising:
 (a) a continuous phase comprising an organic medium; and
 (b) a dispersed phase comprising:
  (i) ultrafine particles; and
  (ii) an amine dispersant of the general formula Z—$CH_2$—$CHR^1$—$COO(R^2$—$O)_n R^3$, wherein Z represents a moiety comprising a plurality of amino groups; $R^1$ represents hydrogen or a methyl group; each $R^2$, which may be the same or different, represents an alkyl group comprising from 1 to 5 carbon atoms; $R^3$ is either hydrogen or a saturated or unsaturated alkyl, alkylphenyl or alkylether group; and n is an integer having a value of 2 to 20,
  wherein the amine dispersant is derived from a polyamine having a molecular weight of at least 300, and
  wherein the dispersant comprises at least 15 percent polyamine.
13. The organic dispersion of claim 12, wherein the ultrafine particles comprise a mixed metal oxide.
14. The organic dispersion of claim 12, wherein the ultrafine particles comprise silica.
15. A coating composition comprising:
 (a) the dispersion of claim 12, and
 (b) a film-forming resin.
16. An organic dispersion comprising:
 (a) a continuous phase comprising an organic medium; and
 (b) a dispersed phase comprising:
  (i) ultrafine particles; and
  (ii) an amine dispersant comprising the Michael addition product of reactants comprising:

(A) a polyether (meth)acrylate represented by the general structure

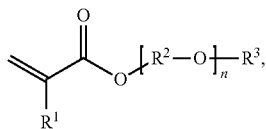

wherein $R^1$ is hydrogen or a methyl group; each $R^2$, which can be the same or different, is a branched or linear alkyl group comprising 1 to 5 carbon atoms; $R^3$ is hydrogen or a saturated or unsaturated alkyl, alkylphenyl, or alkylether group; and n is an integer having a value of 2 to 20, and (B) a polyamine having a molecular weight of at least 300, wherein the dispersant comprises at least 15 percent polyamine and is substantially free of polyester.

* * * * *